United States Patent
Singh et al.

(10) Patent No.: US 10,452,267 B2
(45) Date of Patent: Oct. 22, 2019

(54) STORAGE SCHEME FOR A DISTRIBUTED STORAGE SYSTEM

(71) Applicant: Robin Systems, Inc., San Jose, CA (US)

(72) Inventors: Gurmeet Singh, San Jose, CA (US); Dhanashankar Venkatesan, San Jose, CA (US); Partha Sarathi Seetala, San Jose, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/703,790

(22) Filed: Sep. 13, 2017

(65) Prior Publication Data

US 2019/0079674 A1    Mar. 14, 2019

(51) Int. Cl.
*G06F 12/00* (2006.01)
*G06F 3/06* (2006.01)
*G06F 12/02* (2006.01)

(52) U.S. Cl.
CPC ........... *G06F 3/0604* (2013.01); *G06F 3/065* (2013.01); *G06F 3/067* (2013.01); *G06F 3/0619* (2013.01);
(Continued)

(58) Field of Classification Search
CPC ......... G06F 17/30864; G06F 17/30206; G06F 17/30174; G06F 17/30156; G06F 17/30212; G06F 17/30283; G06F 17/5009; G06F 3/0619; G06F 3/065; G06F 3/067; G06F 17/30533; G06F 11/2012; G06F 11/2023; G06F 11/34; G06F 11/3409; G06F 11/3495; G06F 17/30949; G06F 1/1601; G06F 1/1616; G06F 1/1656; G06F 1/1662;
(Continued)

(56) References Cited

U.S. PATENT DOCUMENTS

| | | |
|---|---|---|
| 4,310,883 A | 1/1982 | Clifton |
| 6,014,669 A | 1/2000 | Slaughter |

(Continued)

FOREIGN PATENT DOCUMENTS

WO    2017008675    1/2017

OTHER PUBLICATIONS

Segment map.
Fast and Secure Append-Only storage with Infinite Capacity.
User Mode and Kernel Mode.
(Continued)

*Primary Examiner* — Yong J Choe
(74) *Attorney, Agent, or Firm* — David R. Stevens; Stevens Law Group

(57) ABSTRACT

A storage scheme allocates portions of a logical volume to storage nodes in excess of the capacity of the storage nodes. Slices of the storage nodes and segments of slices are allocated in response to write requests such that actual allocation on the storage nodes is only in response to usage. Segments are identified with virtual segment identifiers that are retained when segments are moved to a different storage node. Logical volumes may therefore be moved seamlessly to different storage nodes to ensure sufficient storage capacity. Data is written to new locations in segments having space and a block map tracks the last segment to which data for a given address is written. Garbage collection is performed to free segments that contain invalid data, i.e. data for addresses that have been subsequently written to.

20 Claims, 11 Drawing Sheets

(52) U.S. Cl.
CPC ........ *G06F 3/0665* (2013.01); *G06F 12/0253* (2013.01); *G06F 2212/702* (2013.01)

(58) Field of Classification Search
CPC .... G06F 1/187; G06F 2201/815; G06F 9/455; G06F 9/5038; G06F 9/544; G06F 9/546; G06F 11/30; G06F 11/3476; G06F 11/3668; G06F 12/0868; G06F 12/0871; G06F 12/0897; G06F 12/128; G06F 17/243; G06F 17/3005; G06F 17/30076; G06F 17/30132; G06F 17/30265; G06F 17/3028; G06F 17/30315; G06F 17/30433; G06F 17/30539; G06F 17/30584; G06F 17/30749; G06F 17/30752; G06F 17/30772; G06F 17/30867; G06F 21/6218; G06F 2201/86; G06F 2203/0339; G06F 2212/1036; G06F 2212/225; G06F 2212/62; G06F 2216/03; G06F 2221/2101; G06F 3/03547; G06F 3/044; G06F 3/04886; G06F 7/22
See application file for complete search history.

(56) References Cited

U.S. PATENT DOCUMENTS

| | | | |
|---|---|---|---|
| 6,119,214 | A | 9/2000 | Dirks |
| 6,161,191 | A | 12/2000 | Slaughter |
| 6,311,193 | B1 | 10/2001 | Sekido |
| 6,851,034 | B2 | 2/2005 | Challenger |
| 6,895,485 | B1 | 5/2005 | Dekoning |
| 6,957,221 | B1 | 10/2005 | Hart |
| 7,590,620 | B1 | 9/2009 | Pike |
| 7,738,457 | B2 | 6/2010 | Nordmark |
| 7,779,091 | B2 | 8/2010 | Wilkinson |
| 8,171,141 | B1 | 5/2012 | Offer |
| 8,505,003 | B2 | 8/2013 | Bowen |
| 8,527,544 | B1 | 9/2013 | Colgrove |
| 8,601,467 | B2 | 12/2013 | Hofhansl |
| 8,620,973 | B1 | 12/2013 | Veeraswamy |
| 8,745,003 | B1 | 6/2014 | Patterson |
| 8,782,632 | B1 | 7/2014 | Chigurapati |
| 8,788,634 | B2 | 7/2014 | Krig |
| 8,832,324 | B1 | 9/2014 | Hodges |
| 8,886,806 | B2 | 11/2014 | Tung |
| 8,909,885 | B2 | 12/2014 | Corbett |
| 8,966,198 | B1 | 2/2015 | Harris |
| 9,134,992 | B2 | 9/2015 | Wong |
| 9,148,465 | B2 | 9/2015 | Gambardella |
| 9,167,028 | B1 | 10/2015 | Bansal |
| 9,280,591 | B1 | 3/2016 | Kharatishvili |
| 9,330,155 | B1 | 5/2016 | Bono |
| 9,342,444 | B2 | 5/2016 | Minckler |
| 9,367,301 | B1 | 6/2016 | Serrano |
| 9,436,693 | B1 | 9/2016 | Lockhart |
| 9,521,198 | B1 | 12/2016 | Agarwala |
| 9,619,389 | B1 | 4/2017 | Roug |
| 9,635,132 | B1 | 4/2017 | Lin |
| 9,747,096 | B2 | 8/2017 | Searlee |
| 9,870,366 | B1 | 1/2018 | Duan |
| 10,019,459 | B1 | 7/2018 | Agarwala |
| 10,042,628 | B2 | 8/2018 | Thompson |
| 10,061,520 | B1 | 8/2018 | Zhao |
| 10,191,778 | B1 | 1/2019 | Yang |
| 10,282,229 | B2 | 5/2019 | Wagner |
| 2005/0065986 | A1 | 3/2005 | Bixby |
| 2005/0216895 | A1 | 9/2005 | Tran |
| 2007/0067583 | A1 | 3/2007 | Zohar |
| 2007/0260842 | A1 | 11/2007 | Faibish |
| 2008/0189468 | A1 | 8/2008 | Schmidt |
| 2008/0270592 | A1 | 10/2008 | Choudhary |
| 2009/0307249 | A1 | 12/2009 | Koifman |
| 2010/0161941 | A1 | 6/2010 | Vyshetsky |
| 2010/0211815 | A1 | 8/2010 | Mankovskii |
| 2010/0306495 | A1 | 12/2010 | Kumano |
| 2010/0332730 | A1 | 12/2010 | Royer |
| 2011/0083126 | A1 | 4/2011 | Bhakta |
| 2011/0188506 | A1 | 8/2011 | Arribas |
| 2012/0066449 | A1 | 3/2012 | Colgrove |
| 2012/0102369 | A1 | 4/2012 | Hiltunen |
| 2012/0226667 | A1 | 9/2012 | Volvovski |
| 2012/0240012 | A1 | 9/2012 | Weathers |
| 2012/0331113 | A1 | 12/2012 | Jain |
| 2013/0339659 | A1* | 12/2013 | Bybell ................ G06F 12/1027 711/207 |
| 2013/0346709 | A1 | 12/2013 | Wang |
| 2014/0006465 | A1 | 1/2014 | Davis |
| 2014/0047341 | A1 | 2/2014 | Breternitz |
| 2014/0058871 | A1 | 2/2014 | Marr |
| 2015/0046644 | A1 | 2/2015 | Karp |
| 2015/0067031 | A1 | 3/2015 | Acharya |
| 2015/0074358 | A1 | 3/2015 | Flinsbaugh |
| 2015/0134857 | A1 | 5/2015 | Hahn |
| 2015/0186217 | A1 | 7/2015 | Eslami |
| 2015/0326481 | A1 | 11/2015 | Rector |
| 2016/0042005 | A1 | 2/2016 | Liu |
| 2016/0124775 | A1 | 5/2016 | Ashtiani |
| 2016/0197995 | A1 | 7/2016 | Lu |
| 2016/0259597 | A1 | 9/2016 | Worley |
| 2016/0283261 | A1 | 9/2016 | Nakatsu |
| 2016/0357456 | A1 | 12/2016 | Iwasaki |
| 2016/0357548 | A1 | 12/2016 | Stanton |
| 2017/0244787 | A1 | 8/2017 | Rangasamy |
| 2017/0337492 | A1 | 11/2017 | Chen |
| 2017/0371551 | A1 | 12/2017 | Sachdev |
| 2018/0046553 | A1 | 2/2018 | Okamoto |
| 2018/0107419 | A1 | 4/2018 | Sachdev |
| 2018/0113770 | A1 | 4/2018 | Hasanov |
| 2018/0218000 | A1 | 8/2018 | Setty |
| 2018/0246745 | A1 | 8/2018 | Aronovich |
| 2018/0247064 | A1 | 8/2018 | Aronovich |
| 2018/0285353 | A1 | 10/2018 | Ramohalli |
| 2018/0329981 | A1 | 11/2018 | Gupte |
| 2018/0364917 | A1 | 12/2018 | Ki |
| 2019/0065061 | A1 | 2/2019 | Kim |
| 2019/0073132 | A1 | 3/2019 | Zhou |
| 2019/0079928 | A1 | 3/2019 | Kumar |
| 2019/0190803 | A1 | 6/2019 | Joshi |

OTHER PUBLICATIONS

Stankovski et al, "Implementing Time-Critical Functionalities With a Distributed Adaptive Container Architecture", ACM, pp. 1-5, 2016 (Year:2016).

Xu et al. "Precise Memory Leak Detection for Java Software Using Container Profiling", ACM, pp. 151-160, 2008 (Year:2008).

* cited by examiner

STORAGE SCHEME FOR A DISTRIBUTED STORAGE SYSTEM

RELATED APPLICATIONS

This application is related to U.S. application Ser. No. 15/703,719 filed Sep. 13, 2017 and U.S. application Ser. No. 15/703,803 filed Sep. 13, 2017, which are incorporated herein by reference for all purposes.

BACKGROUND

Field of the Invention

This invention relates to storing and retrieving information in a distributed storage system.

Background of the Invention

In a distributed storage system, a plurality of storage nodes host one or more memory devices. Applications executing on one or more other nodes send input/output operations (IOPSs) to the storage nodes. Due to the distributed nature of the system, maintaining data consistency introduces delays and storage overhead in many systems.

The system and methods disclosed herein provide an improved storage scheme for a distributed storage system.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
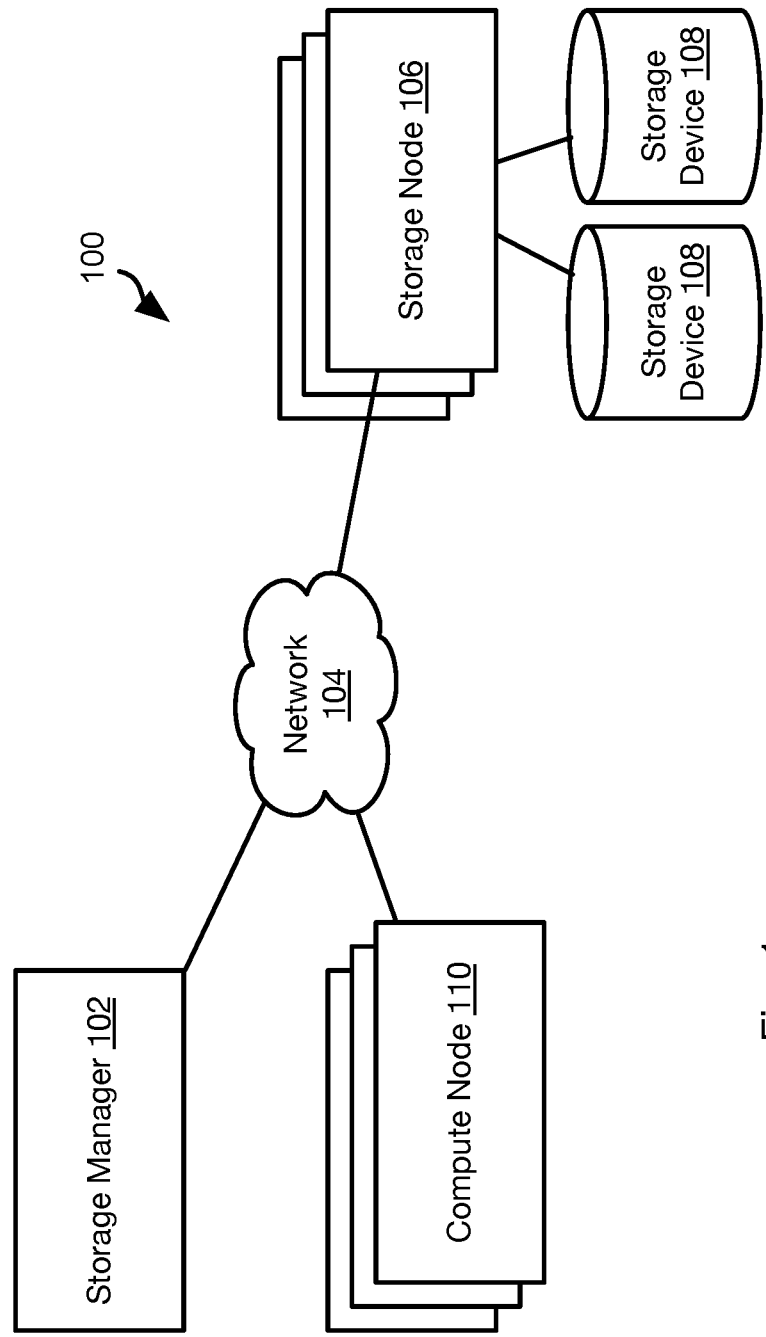
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the storage of data corresponding to one or more logical storage volumes. In particular, the storage manager 102 may be connected by way of a network 104 to the one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
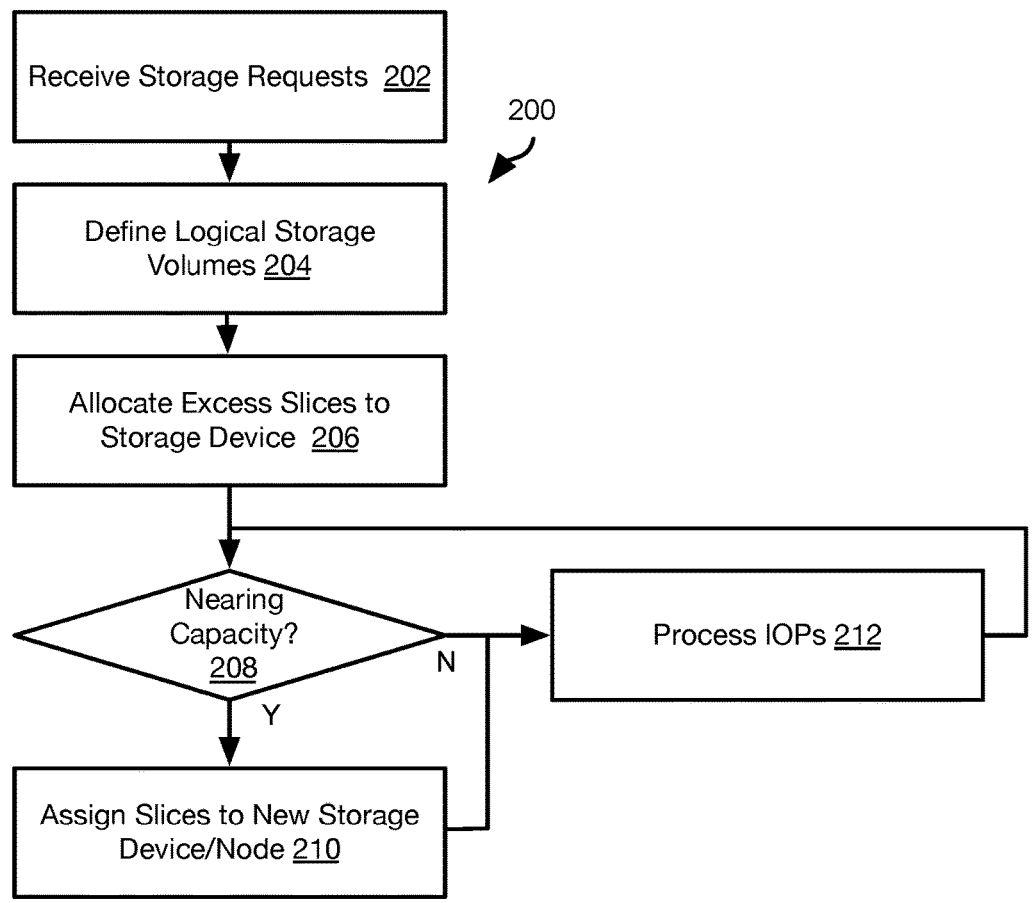
FIG. 2 is a process flow diagram of a method for allocating a logical storage volume among storage nodes in accordance with an embodiment of the present invention.

Referring to FIG. 2, the illustrated method 200 may be performed in order to manage the distribution of a storage volume across one or more storage nodes 106.

The method 200 may include receiving 202 a plurality of storage requests. Each storage request may include an amount of requested storage. The system and methods disclosed herein are particularly suitable for large amounts of data such that the requests may be for one or more Terabytes (TB) of data storage or hundreds of Gigabytes (GB) of storage. For each requests, a logical volume may be defined 204. A single logical volume may be defined for each request or multiple logical storage volumes may be assigned, such as one or more 1 TB logical volumes. The requests may be received from multiple entities, such as multiple customers of a provider of data storage and processing services.

The method 200 may further include allocating 206 slices of the logical volumes to a plurality of storage nodes 106. For example, for 1 TB logical volumes, slices of 1 GB (Gigabytes), 10 GB, 100 GB, or other size. Each slice may be identified by an offset within the logical volume, e.g. 0

GB, 1 GB, 2 GB, 3 GB, etc. for 1 GB slices. Accordingly allocating 206 a slice to a storage node 106 may include mapping the offset to the start of the slice within the storage volume to that storage node 106.

In some embodiments, the number of slices allocated to a storage node 106 may exceed the capacity of the storage node 106. For example, with a thin-provisioning factor of 2, the number of slices allocated to a storage node 106 may be up to twice the capacity of the storage node 106. In typical use, a user will not fill an entire logical storage volume immediately. Accordingly, thin-provisioning enables a provider of storage services to scale up available storage gradually as it is needed while still allowing users to begin using a storage volume immediately.

The method 200 may further include evaluating 208 whether actual data written to each storage nodes 106 is nearing the capacity of the each storage node. For example, if the data written to the storage node 106 exceeds some threshold percentage of a capacity of the storage node 106, e.g. 90%. The amount of data written to the each storage node that is evaluated at step 208 may include valid data, i.e. data written to an address within the logical volume that has not subsequently been overwritten (see FIG. 10 and corresponding description relating to garbage collection for invalid data).

If so, then slices assigned to the each storage node 106 may be assigned 210 to a different storage node 106. For example, additional storage nodes 106 may be added or the slice may be assigned to an existing storage node 106 that has unused capacity. As described in greater detail below, when a slice is reassigned, valid data written to that slice may be moved to the new storage node 106 in an efficient manner that maintains data consistency. In either case, IOPs addressed to the slice may be processed 212 by the current storage node 106 to which the slice is allocated, either the original storage node or the new storage node to which the slice was assigned 210.

The method 200 may be executed by the storage manager 102. For example, usage of a storage node 106 may be reported by each storage node 106 to the storage manager 102. Alternatively, IOPs sent to a storage node 106 may be monitored by the storage manager 102 in order to track usage of the storage node 106.

Figure 3:
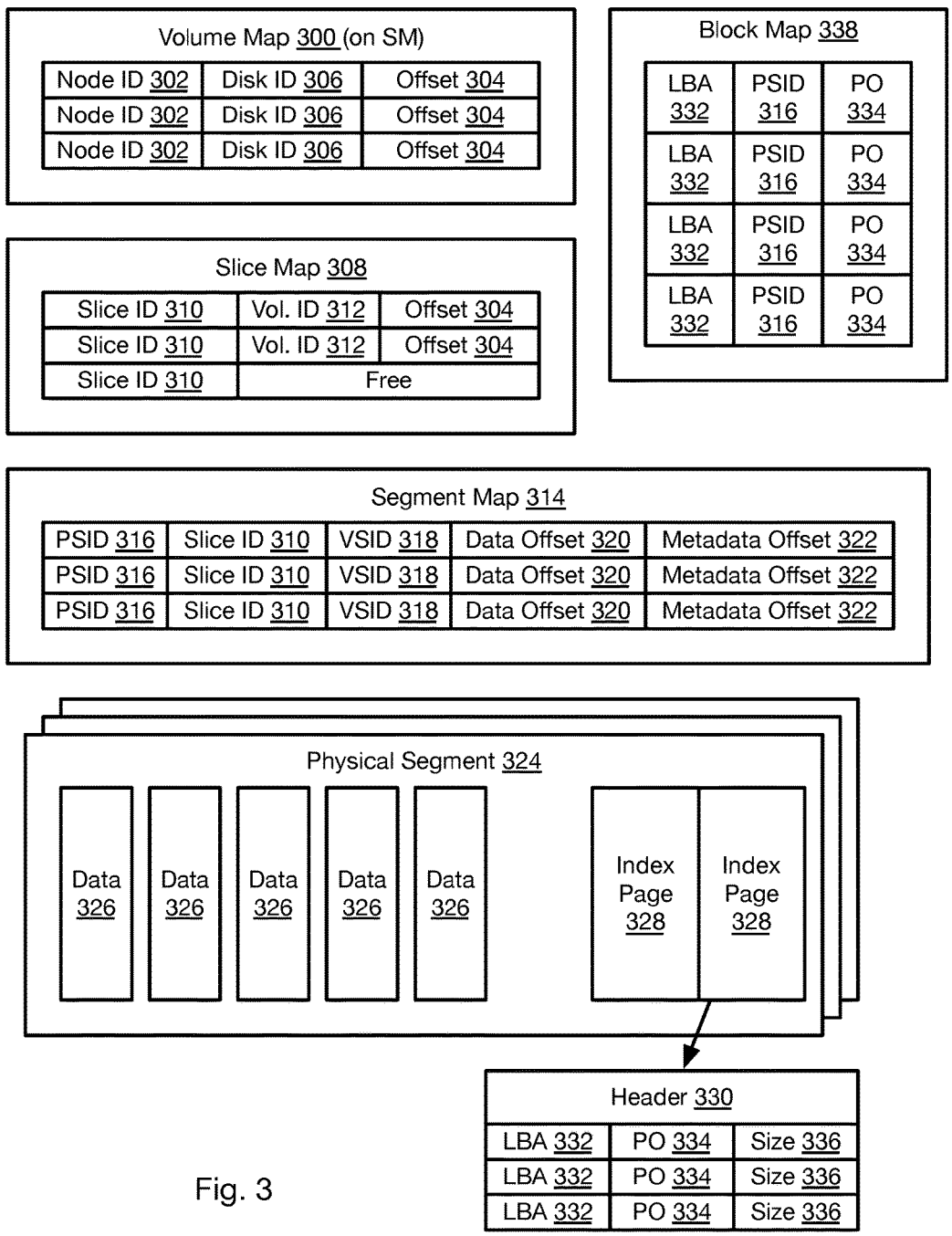
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier 306 of the storage node 106 referencing the specific storage device to which the slice is identified.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of thin-provisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent segment corresponding to a logical volume and slice of a logical volume may easily be determined by the magnitude of the VSIDs 318 of the segments.

The entries of the segment map 314 may further include a data offset 320 for the PSID 316 of that entry. As described in greater detail below, when data is written to a segment it is written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 324 may be obtained from the index pages 328 of that physical segment. As data is written to an LBA 332, the entry for that LBA 332 may be overwritten to indicate the physical segment 324 and physical offset 334 within that segment 324 to which the data is written.

Figure 4:
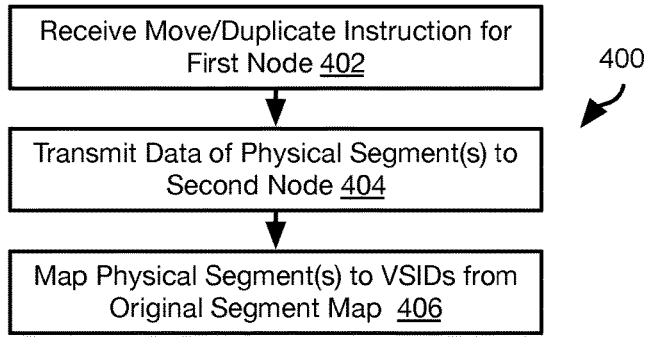
FIG. 4 is a process flow diagram of a method for reassigning portions of a logical storage volume in accordance with an embodiment of the present invention.

FIG. 4 illustrates a method 400 that may be executed upon reassigning a slice from a first storage node 106 to a second storage node 106. Note that the method 400 may also be executed when duplicating a slice from a first storage node 106 onto a second storage node 106.

The method 400 may include receiving 402, by the first storage node 106, an instruction to move or duplicate a slice to the second storage node 106. In response, the first storage node 106 transmits 404 the data of the physical segments 324 mapped to that slice to the second storage node 106. The first storage node 106 further transmits, for each physical segment 324 assigned to the slice, the VSID 318 assigned to that physical segment 324 in the segment map 314 of the first storage node 106.

The second storage node 106 then writes the data received from the first storage node 106 to one or more of its physical segments 324 on its storage devise 108. The second storage node 106 further maps 406 each VSIDs 318 received from the first storage node 106 in the segment map 314 of the PSID 316 of the physical segment 324 to which the data corresponding to that VISID 318 was written. For example, physical segment A corresponding to the slice may be mapped to VSID B. On the second storage node 106, the data from physical segment A may be written to physical segment C. In the segment map 314 of the second storage node 106, physical segment C will be mapped to VSID B. In this manner, data consistency may be maintained inasmuch as the VSID is used to identify the most recent instance of data for a particular LBA, as outlined below.

Figure 5:
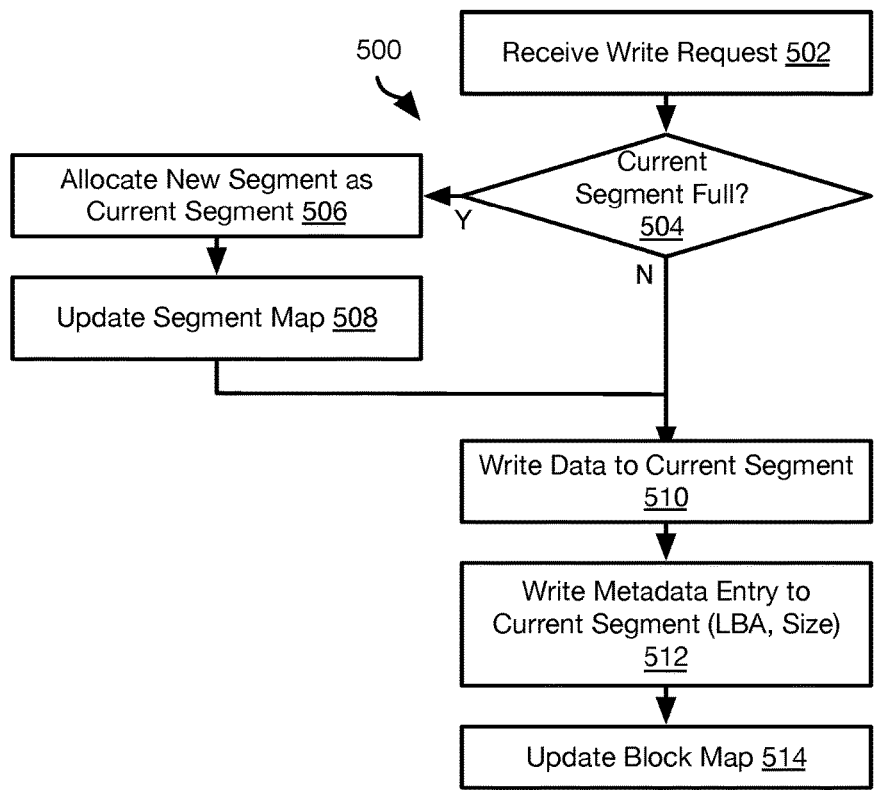
FIG. 5 is a process flow diagram of a method for processing a write request in accordance with an embodiment of the present invention.

FIG. 5 illustrates a method 500 for executing write instructions by a storage node 106, such as write instructions received from an application executing on a compute node 110.

The method 500 includes receiving 502 a write request. The write request may include a data payload, data payload size, and an LBA as well as fields such as a slice identifier, and a volume identifier. Where a slice identifier is included, the LBA may be an offset within the slice, otherwise the LBA may be an address within the storage volume.

The method 500 may include evaluating 504 whether a segment 324 is allocated to the slice and storage volume included in the write request and whether the segment having the highest VSID ("the current segment") for the storage volume and slice has room for the data payload size. In some embodiments, as write requests are performed with respect to a segment, the amount of data written as data payloads 326 and index pages 328 may be tracked. Accordingly, if the amount of previously-written data 326 and the number of allocated index pages 328 plus the size of the payload data and its corresponding metadata entry exceeds the capacity of the current segment, then the segment maybe determined to be full at step 504.

If the current segment is determined 504 to be full, the method 500 may include allocating 506 a new physical segment 324 as the current segment for storage volume and slice in the write request. For example, the entry for a PSID 316 that is not currently allocated to a slice ID 310 may be allocated. In some embodiments, the segment map 314 may include a flag indicating that the physical segment 324 for a particular PSID 316 is free or the entry may be determined to be blank and therefore free.

The segment map 300 may also be updated 508 to include an entry mapping the PSID 316 for the new segment 324 to the logical volume and slice included in the write request and the volume identifier 306 included in the write request. As noted above, a VSID 318 will be assigned to the PSID 316 that will be a number higher than previously assigned VSIDs 318 for that slice such that the VSIDs increase monotonically, subject, of course, to the size limit of the field used to store the VSID 318. However, the size of the field may be sufficiently large that it is not limiting in most situations.

As noted above, where the write requests is the first write request for a slice, corresponding entries for the slice may be made in the slice map 308 that map the offset 304 within the logical volume ID 312 of the write request to a local slice ID 310.

The method 500 may include writing 510 the data payload of the write request to the current segment. As described above, this may include writing 510 payload data to the free location closest to the first end of current segment.

The method 500 may further include writing 512 a metadata entry to the current segment. This may include writing the metadata entry (LBA, size) to the first free location closest to the second end of the physical segment 308. Alternatively, this may include writing the metadata entry to the first free location in an index page 328 that has room for it or creating a new index page 328 located adjacent a previous index page 328. Steps 510, 512 may include updating one or more pointers or table that indicates an amount of space available in the physical segment, such as a pointer to the first free address closest to the first end (data offset 320) and a pointer to the first free address closest to the second end, which may be the first free address before the last index page 328 and/or the first free address in the last index page (metadata offset 322).

The method 500 may further include updating 514 the block map 338 for the logical volume and slice referenced in the write request. In particular, for each LBA 332 referenced in the write request, an entry in the block map 318 for that LBA 314 may be updated to reference the PSID 302 of the current segment and possibly the physical offset 334 within the current segment to which the data payload was written. A write request may be written to a range of LBAs 314. Accordingly, the entry in each LBA 314 in that range may be updated to refer to the PSID 316 of the current segment.

Figure 6:
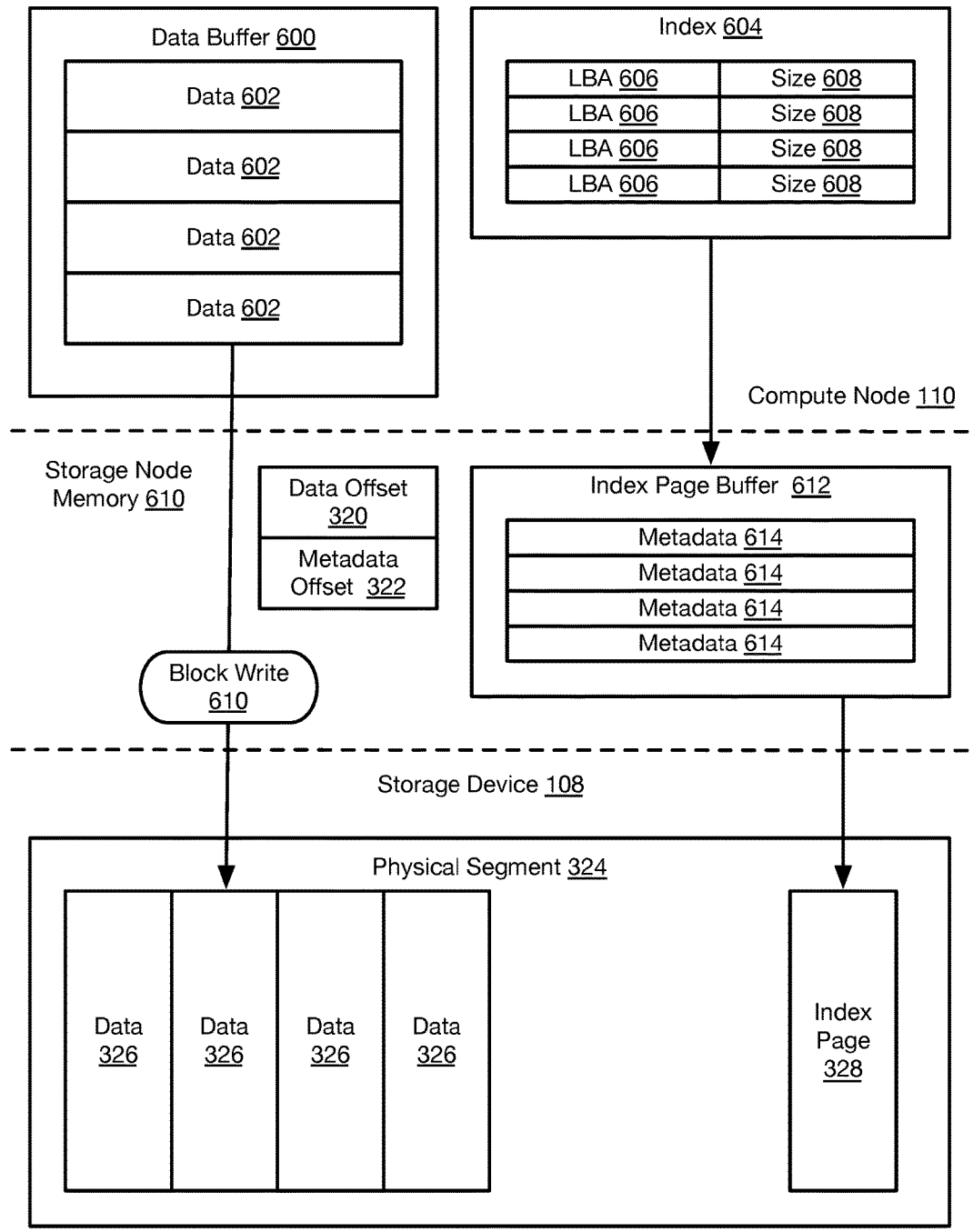
FIG. 6 is a diagram illustrating the block processing of write requests in accordance with an embodiment of the present invention.

FIG. 6 is a diagram illustrating processing of batches of write requests. On the compute node 110, a data buffer 600 stores data payloads 602 of write requests all addressed to a same storage node 106. An index 604 stores the LBAs 606 from the write requests and may also store the sizes 608 of the data payloads from each write requests. The data buffer 600 may store data payloads for a predetermined time period or until the total amount of data in the data buffer 600 reaches a threshold size.

Once the buffer is full or a time limit is reached, the data payloads 602 are written 610 in a block write to the storage device 108 of the storage node 106 addressed by the write requests. The data payloads 602 are then written as data 326 to a physical segment 324. The physical segment 324 may be the current segment identified or allocated as described above with respect to the method 500. In particular, the data payloads 602 may be written to the current segment starting at the data offset 320 for the current segment. Where the block write exceeds the capacity of the current segment, a portion may be written to the current segment and the remainder written to a newly allocated segment.

The index 604 may also be written to memory 610 of the storage node 106. For example, the LBAs 606 and sizes 608 may be written to an index page buffer 612, such as in the form of metadata entries 614. When the index page buffer 612 is full it is written to the current segment in the form of an index page 328. In particular, the contents of the index page buffer 612 may be written as an index page 328 at the first free location from the second end of the current segment. The contents of the index page buffer 612 may be combined with a header to form the index page 328. Likewise, the contents of the index page may be combined with the physical offset locations within the current segment to which the corresponding payload data 602 were written.

Figure 7:
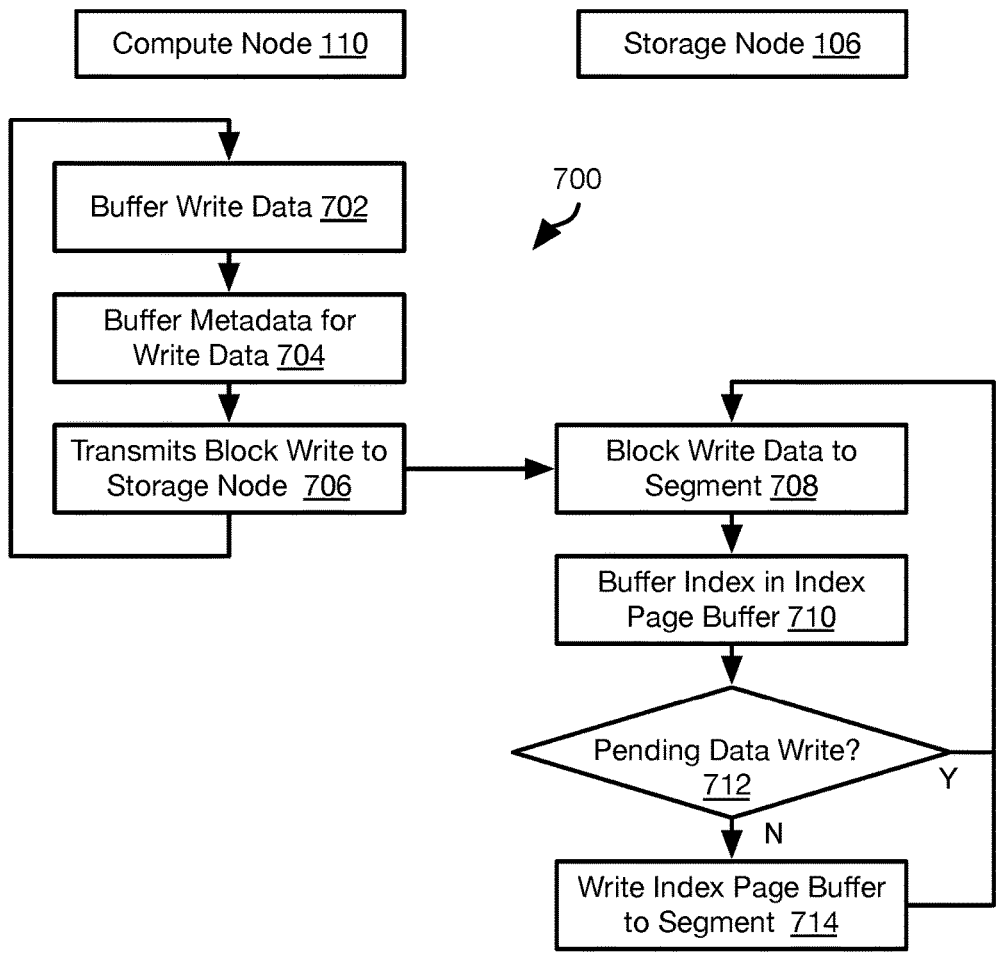
FIG. 7 is a process flow diagram of a method for block processing write requests in accordance with an embodiment of the present invention.

FIG. 7 illustrates a method 700 for performing block writes that may be executed by a compute node 110 and a storage node 106. The method 700 may include, by the compute node 110, buffering 702 data payloads by the compute node 110 as well as buffering 704 metadata for the data payloads, i.e. the LBA and size of each write request. The compute node 110 then transmits 706 a block write to the storage node. The block write may include both the buffered data payloads as well as the buffered metadata corresponding to the buffered data payloads.

The storage node 106 receives the data payloads and metadata. The storage node 106 writes 708 the data payloads to the current segment. However, the metadata may be buffered 710 in an index page buffer 612 and not written to an index page 328 of the current segment.

For example, the method 700 may include evaluating 712 whether the storage node 106 has any pending write requests, such as any pending write requests for the storage device 108 storing the current segment. If so, then the metadata is not written. At a time when there is found 712 to be no pending write requests, the index page buffer 612 may then be written 714 to the current segment. In this manner, the latency of a write command will be the latency of the block write of the data payload rather than the latency of two writes (payload and metadata). In some embodiments, if the index page buffer 612 is filled to the size of an index page 328, it will be written regardless of whether there is a pending write request. In other embodiments, the index page buffer 612 is large enough that filling of the index page buffer is not likely to occur. In such embodiments, the contents of the index page buffer 612 may be written to multiple index pages 328 which may span multiple physical segments 324.

Figure 8:
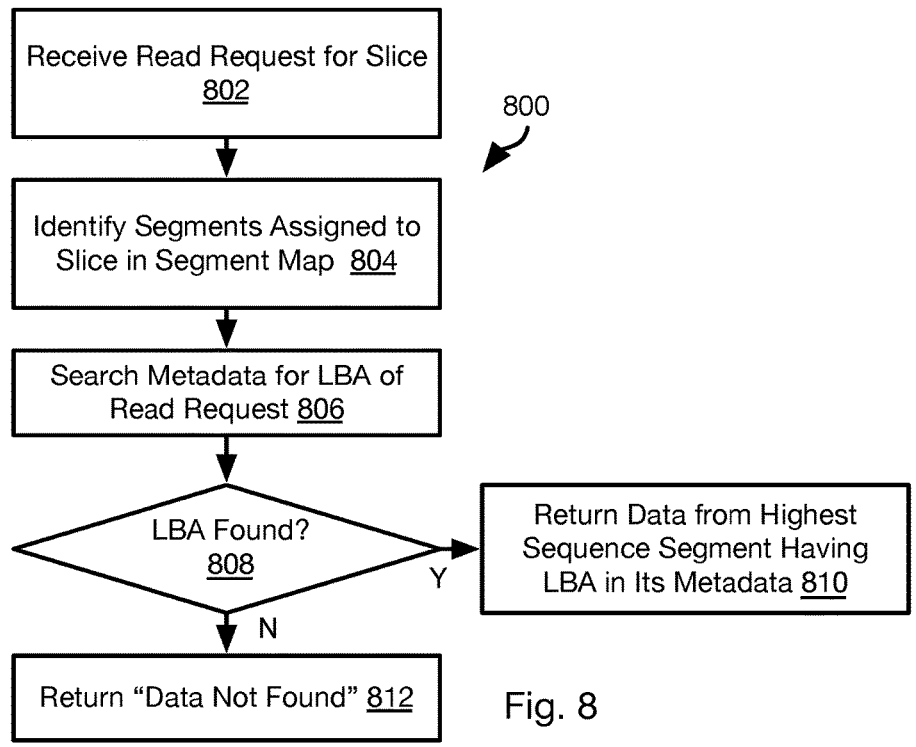
FIG. 8 is a process flow diagram of a method for processing a read request in accordance with an embodiment of the present invention.

FIG. 8 illustrates a method 800 that may be executed by a storage node 106 in response to a read request. The read request may be received from an application executing on a compute node 110. The read request may include such information as a volume ID, slice offset, LBA, and size (e.g. number of 4 KB blocks to read).

The method 800 may include receiving 802 the read request by the storage node 106 and identifying 804 one or more PSIDs 316 associated with the volume ID and slice offset of the read request in the segment map 314 and slice map 308. The method 800 may further include searching 806 the metadata entries of the physical segments 324 corresponding to these PSIDs 316 for references to the LBA included in the read request.

The searching of step 806 may be performed in order of decreasing VSIDs 318, i.e., such that the metadata entries for the last allocated PSID 316 are searched first. In this manner, if reference to the LBA is found, the metadata of any previously-allocated PSIDs 316 does not need to be searched.

Searching 806 the metadata for a segment ID 302 may include searching one or more index pages 328 of the physical segment 308 corresponding to the segment ID 302. As noted above, one or more index pages 328 are stored at the second end of the physical segments 324 and entries are added to the index pages 328 in the order they are received. Accordingly, the last-written metadata including the LBA in the last index page 312 (furthest from the second end of the physical segment 324) in which the LBA is found will correspond to the valid data for that LBA. To locate the data payload 326 corresponding to the last-written metadata for the LBA in the physical segment 324, the sizes 336 for all previously-written metadata entries of the physical segment 342 may be summed to find a start address in the physical segment 308 for the data 310. Alternatively, as noted above, the physical offset 334 of the data payload 326 corresponding to the LBA 332 may be recorded with the entry including the LBA 332 in the index page 328. Accordingly, summing to find the offset is not needed.

In some instances, the LBA 332 of a write request is recorded in the block map 338 along with the PSID 316 for that LBA 332 and the physical offset 334 for that LBA 332. Accordingly, read requests including an LBA 332 referenced in the block map 338 may be processed by returning the data payload 326 at the physical offset 334 in the physical segment 324 referenced by PSID 316 in the entry for that LBA 332 in the block map 338.

If reference to the LBA is found 808 in the index pages 328 of any physical segment 324 corresponding to any PSIDs 316 mapped to the slice offset and volume ID of the read request, them the data payload 326 is read and returned 810 from a physical offset corresponding to the last-written metadata entry including the LBA in the physical segment 324 corresponding to the PSID 316 having the highest numbered VSID 318. If not, an error message may be returned 812, e.g. a message indicating that the requested data was not found.

Where the block map 338 is used, the data may be read from the physical offset 334 of the physical segment 324 referenced by the PSID 316 mapped to the LBA of the read request in the block map 338 corresponding to the volume ID and slice offset of the write request. In such embodiments, if the block map 338 corresponding to the volume ID and slice offset does not include reference to the LBA then a message may be returned indicating that the data was not found.

Figure 9:
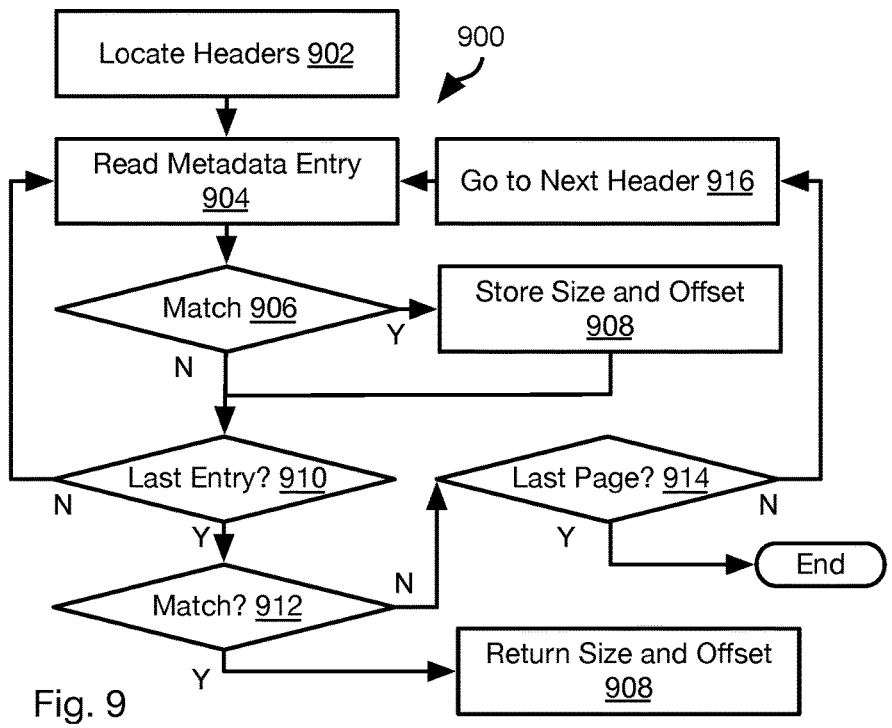
FIG. 9 is a process flow diagram of a method for identifying a location of requested data in accordance with an embodiment of the present invention.

Referring to FIG. 9, the illustrated method 900 may be executed during the searching step of step 806 to determine whether a physical segment 324 stores data for a particular LBA. As noted above, segments allocated to a slice are assigned a VSID that increases monotonically in value. Accordingly, physical segments 324 mapped to a slice may be searched according to the method 900 in order of decreasing VSID. In this manner, once an instance of an LBA is found, further searching of other segments is not needed.

The method 900 may include locating 902 headers. For example, index pages may have headers 330 that are uniquely coded and may include meaningful information, such as a segment identifier or a VSID. Accordingly, starting at the second end, the physical segment 324 may search for headers until no headers are found. For example, starting from the second end of the physical segment 324 the expected locations of an index page may be evaluated. For example, given a size of an index page and a location of the header at the beginning of the area of memory for an index page, the expected locations of headers can be found at offsets equal to the size of the index page from the second end of the physical segment 324. Headers 330 may be evaluated at expected locations until data that is not coded as a header is found. The method 900 may proceed to process the index pages 328 corresponding to the located headers. Since the header furthest from the second end is the most recent, processing may begin with index page including this header as the current index page.

The method 900 may include reading 904 an entry from the current index page starting from the entry immediately following the header and evaluating 906 whether the entry matches the LBA that is being searched. If so, the size and/or offset may be stored 908. The entry is found 910 not to be the last entry in the current index page, then the next processing repeats at step 904 for the next entry in the current index page. Whether an entry is the last entry may be determined by either (1) the entry being the N the entry, where N is the maximum number of entries or (b) the entry being followed by a blank entry. For example, index pages may be initialized to zero to enable the identification of blank entries.

If the entry is found 910 to be the last entry in the current index page and a match is determined 912 to have been found at a previous iteration of step 906, then the stored size and offset are returned 908 as the location of valid data for the LBA that is being searched.

If no match is determined 912 to have been found, then the method 900 may include evaluating 914 whether the current index page is the last index page, i.e. the header of the current index page is the one closest to the second end of the physical segment 324. If not, the method continues 916 to the next header, i.e. the next header that is closer to the second end than the current header. The method then continues at step 904 with the next header as the current header. If the last entry of the last index page is searched and no match is found, then the method 900 ends, thereby indicating that no match for the LBA being searched was found in the physical segment 324.

Note that a block map 338 may be generated after a first read or write request is received for a slice of a logical storage volume. As described above, this block map 338 may be updated for each write request such that the PSID 316 and physical offset 334 for each LBA 332 in the slice is known. Accordingly, the process of searching the index pages may be omitted.

Note also that the process of searching the index pages for the last-written data for a particular LBA, as described above, may be performed for all PSIDs 316 in the segment map in order to generate or regenerate the block map 338 for the slices stored on a storage node 106, such as if block map 338 for a slice is corrupted or lost during a system crash.

Figure 10:
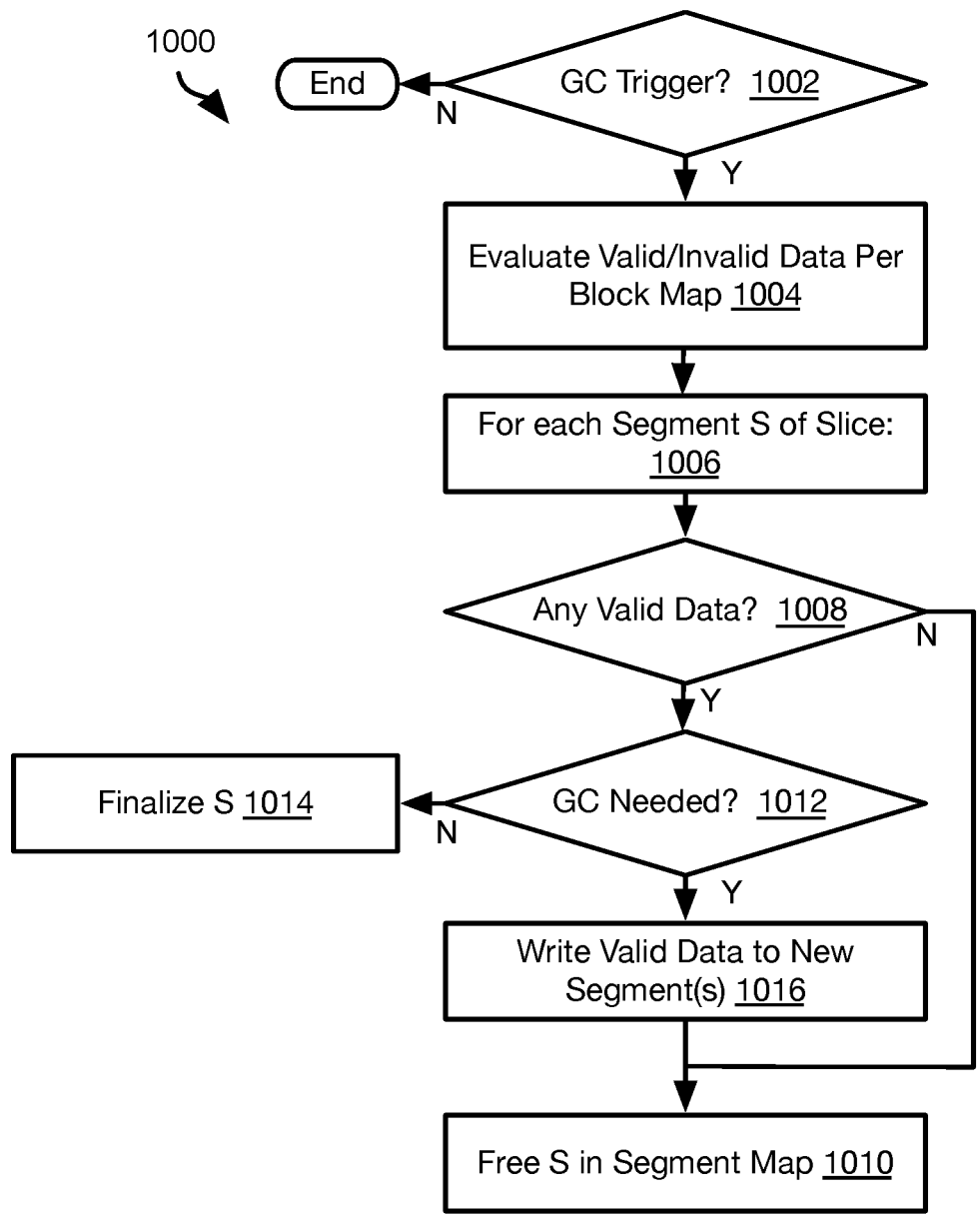
FIG. 10 is a process flow diagram of a method for performing garbage collection in accordance with an embodiment of the present invention.

FIG. 10 illustrates a method 1000 for performing garbage collecting using the storage scheme described above. The method 1000 may be executed by each storage node 106. The method 1000 may execute within a separate thread of execution and that thread may have a low priority in order to reduce the impact. The method 1000 may be executed for each slice allocated on the storage node 106 (hereinafter "the slice"), e.g., for each slice ID 310 that has been assigned to a volume ID 312 and slice offset 304.

The method 1000 may include periodically evaluating 1002 whether a garbage collection (GC) trigger has occurred. Various events may trigger garbage collection, such as:

A number of segments in the slice allocated on the storage node 106 reaching a threshold amount or percentage of available segments;

An amount of available disk space falling below a threshold;

Number of finalized segments in the slice being greater than a threshold (see discussion of finalized segments below)

The GC trigger may be a function of some or all of the above-mentioned parameters. For example, the threshold number of allocated segments or finalized segments that will trigger garbage collection may decrease as the amount of available disk space decreases.

If the GC trigger is not found 1002 to be present, then the method 1000 may end, such as for a wait interval after which the method 1000 will be repeated again. If the GC trigger is found 1002 to be present, some or all of the remaining steps of the method 1000 may be executed.

The method 1000 may include evaluating 1004 the block map 338 of the slice to identify valid data. In particular, the entry for each LBA 332 indicates the PSID 316 containing the latest data written to the each LBA. Where the block map 338 includes the physical offset 334, the location of the valid data within the physical segment 324 corresponding to that PSID 316 is also known. Where a physical offset 334 is not included in the block map 338, the location of the latest data for the each LBA may be determined by evaluating the index pages 328 of the physical segment corresponding to that PSID 316 (see, e.g., the method 900 for finding the location of the latest version of data for a particular LBA within a physical segment 324). All other instances of data corresponding to the each LBA in are invalid. A physical segment 324 corresponding to a PSID 316 that is not referenced in the block map 338 contains no valid data.

The data payloads 326 of the physical segments 324 may be flagged as valid or invalid based on their status determined as outlined above. In some embodiments, only valid segments are flagged. In others, only invalid segments are flagged.

The method 1000 may include looping 1006 through each segment S of a slice, e.g. each PSID mapped to the slice ID 310 of the slice that is the subject of the method 1000. In particular, the subsequent steps of the method 1000 may be evaluated with respect to the segment S.

If the segment S is found 1008 not to include any valid data, then it is marked 1010 as free in the segment map 314. The segment S is therefore available to be re-allocated and overwritten.

If the segment S is found 1008 to include valid data, then the method 1000 may include evaluating 1012 whether GC is needed. For example, if the amount of valid data is below a valid-data threshold (e.g., 40%), then GC may be determined 1012 to be needed. Alternatively, if the amount of invalid data is above an invalid-data threshold (e.g., 60%), then GC may be determined 1012 to be needed. Any other function of the amount of valid and/or invalid data in the segment S may be used to determine whether GC is needed. Likewise, the percentages used for the valid-data and invalid-data thresholds may be any value selected to achieve a desired performance. In particular, there are tradeoffs between increasing segment availability by performing frequent GC and decreasing the performance penalty due to performing GC less frequently.

If GC is determined not to be needed, the segment S may be finalized 1014. When a segment is finalized it may be flagged as final and therefore not available to be written to. The flag indicating that the segment S is final may be included in the entry for the segment in the segment map 314 corresponding to the segment S.

If GC is determined 1012 to be needed, then valid data from the segment S is written 1016 to a new segment. In particular, the valid payload data 326 and its corresponding metadata entry in the index pages 328 (LBA 332 and possibly size 336) may populate a write request directed to the storage node 106. The write request may be processed in the same manner as other write requests, such as according to the method 500 of FIG. 5. The segment S is then flagged 1010 as free in the segment map 314.

Figure 11:
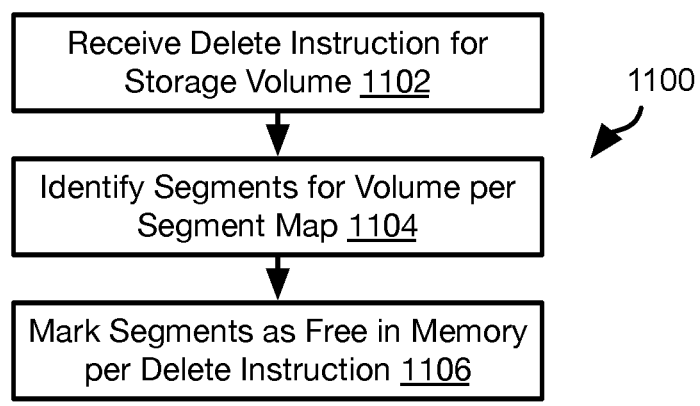
FIG. 11 is a process flow diagram of a method for deleting segments in accordance with an embodiment of the present invention.

Referring to FIG. 11 the storage scheme described herein enables efficient deletion of entire storage volumes with very low overhead. The method 1100 may be executed by the storage node 106. The method 1100 may include receiving 1102 an instruction to delete a storage volume, such as by referencing a volume ID 312 of the storage volume. The method 1100 includes identifying 1104 segments in the segment map 314 that are mapped to that storage volume ID 312. These entries are all marked 1106 as free such that those segments mapped to the storage volume ID 312 are now available to be over written. Note that the segment map 314 may be stored in memory and in a non-transitory storage device. For example, the segment map 314 may be updated in memory according to the methods described herein and the copy in non-transitory memory may be updated less frequently. The segments may be marked 1106 as free only in memory without immediately writing the updated segment map 314 to the non-transitory memory. However, the updated segment map 314 may eventually be written to the non-transitory memory.

In this manner, the overhead of deleting a storage volume is reduced. The segment map 314 need not be updated immediately in the non-transitory memory. For example, updating may only be performed when there are no other pending read or write requests.

Figure 12:
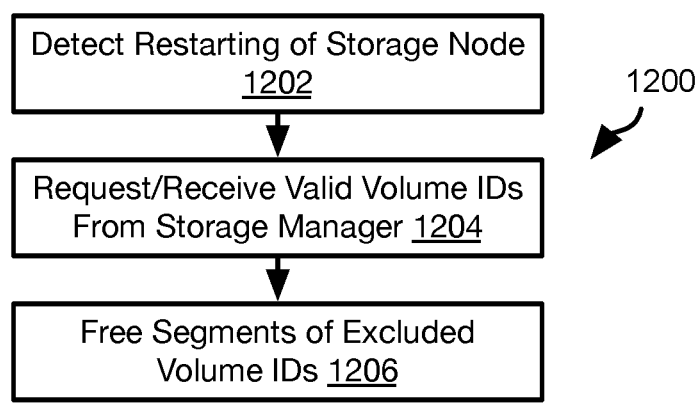
FIG. 12 is a process flow diagram of a method for restarting a storage node in accordance with an embodiment of the present invention.

FIG. 12 illustrates a method 1200 that may be executed by the storage node 106 to handle the case where a storage node shuts down before the updated segment map 314 is written to non-transitory memory following a delete instruction for a storage volume. Note that the method 1200 relies on the assumption that the storage manager 102 records the deletion of the storage volume from the storage node 106 as part of the process of deleting the storage volume from the storage node 106.

The method 1200 may include detecting 1202 by the storage node 106 that it has been restarted. If the storage node 106 is detected 1202 to have been restarted, the storage node 106 may request and receive 1204 identifiers of storage volumes that are assigned to the storage node 106. The storage node 106 will then mark 1206 as free in the storage map 314 entries for all segments that do not include one of the storage volume identifiers received at step 1204. In this manner, failure to write the updated storage map 314 to non-transitory memory does not result data inconsistency.

Figure 13:
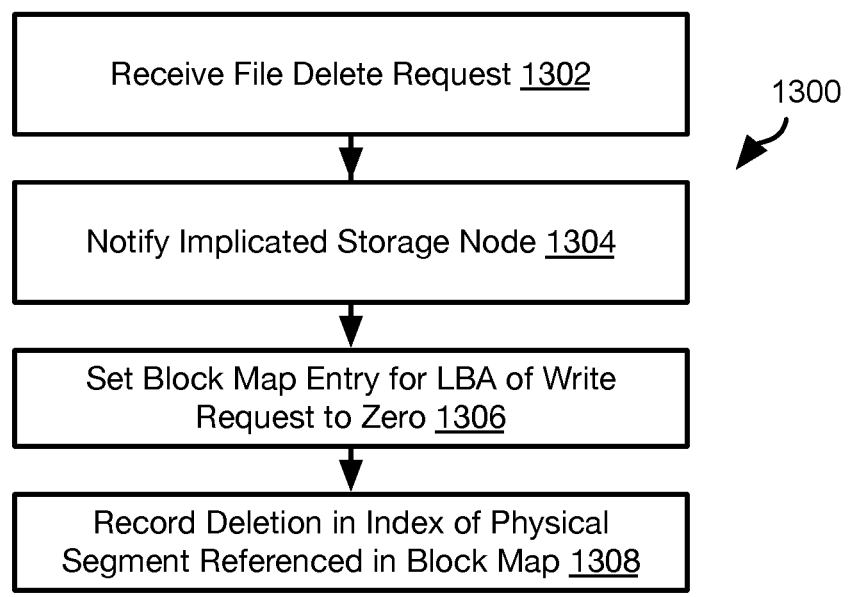
FIG. 13 is a process flow diagram of a method for processing delete requests in accordance with an embodiment of the present invention.

Referring to FIG. 13, a thin-provisioned logical storage volume starts out with no physical storage allocated. When a given block on a thin-provisioned volume is written, the storage module allocates the physical storage to that block in the form of a segment. Gradually as more and more blocks are written to the volume, the amount of storage allocated to the volume increases (the volume slowly "thickens").

Consider a file system (FS) that is created on top of a thin provisioned volume. When the user creates and writes a file on the FS, the above process happens and the volume thickens. Now if the user deletes the file, the FS would consider the space as free, but the thin-provisioned volume will still have physical storage allocated to those blocks used by the file that has now been deleted. Normally the FS, tends to spread writes all over the logical storage volume to avoid over-writing the same physical storage for reasons such as: allocating and writing sequentially, wear leveling, etc. This causes the amount of data actually stored on a logical storage volume to be much smaller than the amount of physical storage used by the logical storage volume and severely restricts the benefits of thin-provisioning.

FIG. 13 illustrates a solution to the above problem. The illustrated method 1300 includes receiving 1302 a request to delete a file by the FS. IN particular, the FS may then notify 1304 a storage node 106 storing the underlying storage volume when the physical storage allocated to a given logical block address (LBA) can be freed. In the LINUX kernel, delete commands from the FS are received as a special WRITE request with no data for the freed blocks. The storage stack therefore typically handles this request very efficiently as this request is in the file deletion flow and users expect really large files to be deleted instantly. Also the FS expects that any future reads to these LBA should act as if these blocks were never written.

These special write requests may be processed differently according to the method 1300. When a special WRITE request without data is received from the FS by a module executing on the compute node 110, this module propagates the request to the appropriate storage node 106 that has the physical blocks used by the LBA. These requests from the compute node may be batch processed just like the READ and WRITE requests described above.

When the storage node gets an individual or batched request with the special WRITE requests, it sets 1306 the block map entry for the LBAs in the request to zero. This ensures that future reads will consider these blocks are unwritten. This also ensures that GC will automatically consider the physical blocks that hold the previous version of the LBA data, as invalid and discard them. To persist this, the storage node also records 1308 the deletion in the index entry in the index page 328 for each deleted LBA to indicate that these blocks have all been "discarded."

If the storage node crashes before GC has reaped the invalidated blocks, when the storage node recovers, the "discard" index entry will ensure that the block map 338 still marks the LBA as unwritten and GC recognizes the previous blocks as stale and reaps them.

Figure 14:
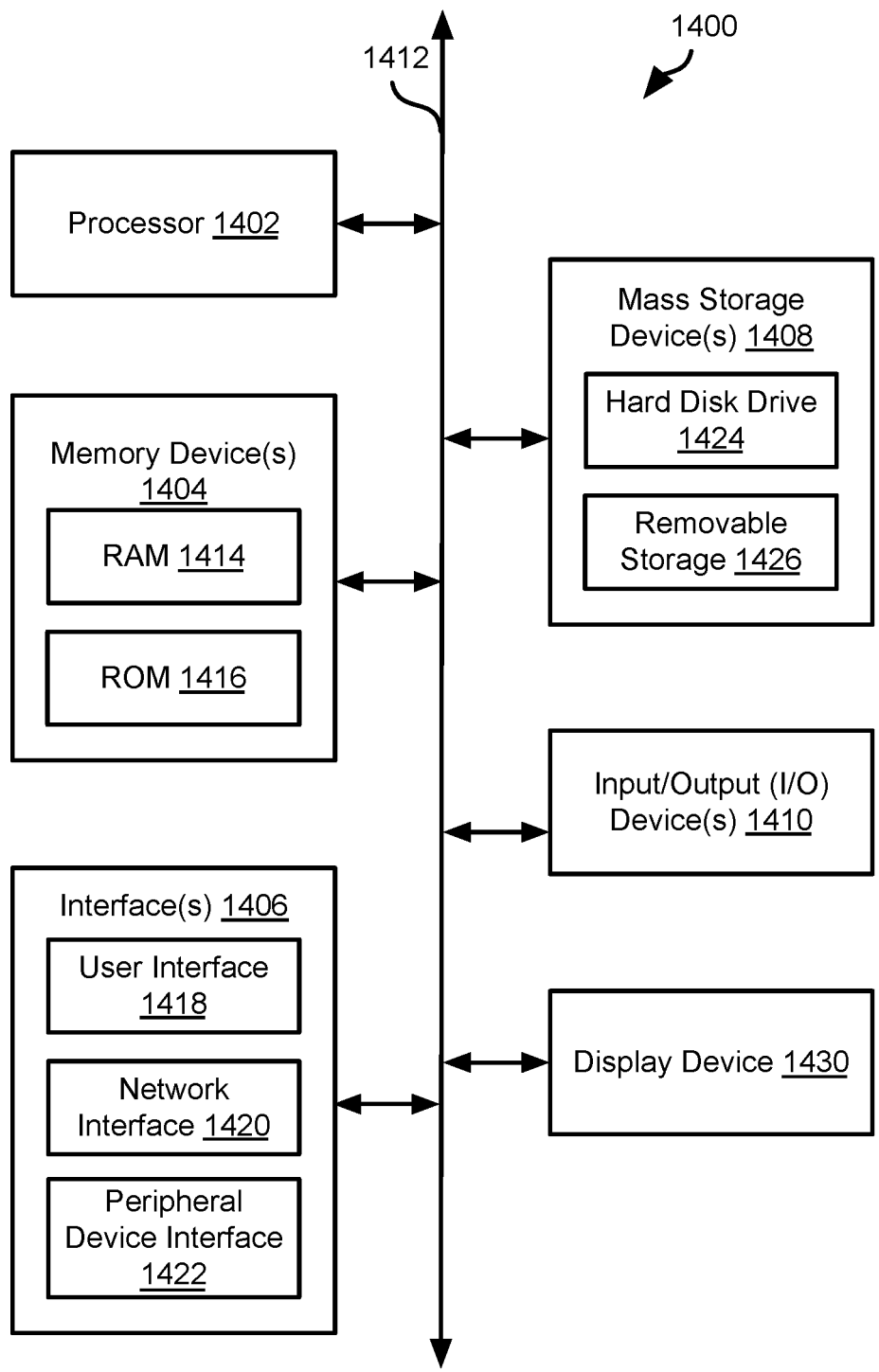
FIG. 14 is a schematic block diagram of an example computing device suitable for implementing methods in accordance with embodiments of the invention.

FIG. 14 is a block diagram illustrating an example computing device 1400. Computing device 1400 may be used to perform various procedures, such as those discussed herein. The storage manager 102, storage nodes 106, and compute nodes 110 may have some or all of the attributes of the computing device 1400.

Computing device 1400 includes one or more processor(s) 1402, one or more memory device(s) 1404, one or more interface(s) 1406, one or more mass storage device(s) 1408, one or more Input/output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, I/O device(s) 1410, and display device 1430 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A storage system comprising:
   a storage node comprising a storage device, one or more processing devices, and one or more memory devices operably coupled to the one or more processing devices, the one or more memory devices storing executable code effective to cause the one or more processing devices to—
   store a segment map including segment entries, each segment entry referencing a segment of a plurality of segments available for storage on the storage device, a storage volume to which the segment of the plurality of segments is allocated, and a virtual segment identifier;
   store data in at least a portion of the plurality of segments such that each segment of the plurality of segments includes a first portion including data payloads from a plurality of write requests and a second portion including metadata entries, each metadata entry indicating a write address within the storage volume for one of the data payloads stored in the first portion;
   for each write address included in the metadata entries of the segments of the plurality of segments—
   mark as invalid all data payloads in the segments of the plurality of segments that have a corresponding metadata entry including the each write address except for a last-written data payload of a latest segment of the plurality of segments for the each write address, the latest segment for the each write address having a highest valued virtual segment identifier out of all the segments of the plurality of segments including the each write address in the metadata entries thereof.

2. The storage system of claim 1, wherein the executable code is further effective to cause the one or more processing devices to:
   identify a portion of the plurality of segments for garbage collection;
   for each segment of the plurality of segments in the portion—
   identify valid data payloads in the first portion of the each segment that have not been marked as invalid;
   write the valid data payloads and the metadata entries corresponding to the valid payloads in the second portion to a new segment of the plurality of segments;
   change the segment entry for the each segment to indicate that it is free.

3. The storage system of claim 2, wherein the executable code is further effective to cause the one or more processing devices to identify the portion of the plurality of segments for garbage collection by determining that each segment of the portion of the plurality of segments has an amount of valid payloads that is below a threshold amount.

4. The storage system of claim 3, wherein the threshold amount is at least 40% of a storage capacity of the each segment.

5. The storage system of claim 1, wherein the executable code is further effective to cause the one or more processing devices to:
maintain a block map by, for each write request of a plurality of write requests, update an entry in the block map corresponding to a write address in the each write request to include a segment identifier of a segment of the plurality of segments to which a data payload from the each write request is written;
mark as invalid all data payloads in the plurality of segments for which the corresponding metadata entry including the each write address except for the last-written data payload of the latest segment for the each write address by marking as invalid all data payloads in segments other than a segment referenced by the entry in the block map corresponding to the each write address.

6. The storage system of claim 1, wherein the executable code is further effective to cause the one or more processing devices to:
maintain a block map by, for each write request of a plurality of write requests, update a block map entry in the block map corresponding to a write address in the each write request to include—
(a) a segment identifier of a segment of the plurality of segments to which a data payload from the each write request is written and
(b) an offset within the segment of the plurality of segments to which the data payload from the each write request was written;
for each write address included in the metadata entries of the plurality of segments, mark as invalid all data payloads in the plurality of segments for which the corresponding metadata entry includes the each write address except for the data payload at the offset included in the block map entry for the each write address within the segment referenced in the block map entry for the each write address.

7. The storage system of claim 1, wherein the first portion of the each segment begins at a first end of the each segment and the second portion of the each segment begins at a second end of the each segment opposite the first end.

8. The storage system of claim 7, wherein the executable code if further effective to cause the one or more processing devices to process the plurality of write requests by, for each write request of the plurality of write requests:
if a segment entry in the segment map references a storage volume referenced by the each write request and corresponds to an available segment, the available segment being a segment of the plurality of segments having sufficient space for the data payload of the each write request, (a) writing the data payload from the each write request at a free location at an end of the first portion of the available segment, (b) adding a new metadata entry to the second portion, the new metadata entry including a write address from the each write request, (c) adding a first block map entry to a block map, the block map entry mapping the write address from the each write request to the available segment and including an offset within the available segment to which the data payload of the each write request was written; and
if no segment entry in the segment map both references the storage volume referenced by the each write request and corresponds to a segment of the plurality of segments having sufficient space for the data payload of the each write request, (d) selecting an unassigned segment from the plurality of segments, (e) adding a reference to the storage volume referenced by the each write request to a segment entry of the segment map corresponding to the unassigned segment of the plurality of segments, (f) writing the data payload of the each write request to a free location at an end of the first portion of the unassigned segment, (g) adding the new metadata entry to the second portion of the assigned segment, (h) adding a second block map entry to the block map, the block map entry mapping the write address from the each write request to the assigned segment and including an offset within the assigned segment to which the data payload of the each write request was written.

9. The storage system of claim 8, wherein the executable code if further effective to cause the one or more processing devices to process a plurality of read requests by, for each read request of the plurality of read requests:
identifying a read block map entry in the block map corresponding to the each read request; and
reading read data from an offset of the read block map entry in a segment of the plurality of segments referenced by the read block map entry.

10. The storage system of claim 1, further comprising one or more application nodes in data communication with the storage node, the executable code further effective to cause the one or more processing devices to receive the plurality of write requests from the one or more application nodes.

11. A method comprising:
providing a storage node comprising a storage device, one or more processing devices, and one or more memory devices operably coupled to the one or more processing devices;
storing, by the storage node, a segment map including segment entries, each segment entry referencing a segment of a plurality of segments available for storage on the storage device, a storage volume to which the segment of the plurality of segments is allocated, and a virtual segment identifier;
storing, by the storage node, data in at least a portion of the plurality of segments such that each segment of the at least the portion of the plurality of segments includes a first portion including data payloads from a plurality of write requests and a second portion including metadata entries, each metadata entry indicating a write address within the storage volume for one of the data payloads stored in the first portion;
for each write address included in the metadata entries of the segments of the plurality of segments—
marking, by the storage node, as invalid all data payloads in the plurality of segments that have a corresponding metadata entry including the each write address except for a last-written data payload of a latest segment for the each write address, the latest segment for the each write address having a highest valued virtual segment identifier out of all the segments of the plurality of segments including the each write address in the metadata entries thereof.

12. The method of claim 11, further comprising:
identifying, by the storage node, a portion of the plurality of segments for garbage collection;
for each segment of the plurality of segments in the portion—
identifying, by the storage node, valid data payloads in the first portion of the each segment that have not been marked as invalid;
writing, by the storage node, the valid data payloads and the metadata entries corresponding to the valid payloads in the second portion to a new segment of the plurality of segments;
changing, by the storage node, the segment entry for the each segment to indicate that it is free.

13. The method of claim 12, further comprising identifying, by the storage node, the portion of the plurality of segments for garbage collection by determining that each segment of the portion of the plurality of segments has an amount of valid payloads that is below a threshold amount.

14. The method of claim 13, wherein the threshold amount is at least 40% of a storage capacity of the each segment.

15. The method of claim 11, further comprising:
maintaining, by the storage node, a block map by, for each write request of a plurality of write requests, updating an entry in the block map corresponding to a write address in the each write request to include a segment identifier of a segment of the plurality of segments to which a data payload from the each write request is written;
marking as invalid, by the storage node, all data payloads in the plurality of segments for which the corresponding metadata entry including the each write address except for the last-written data payload of the latest segment for the each write address by marking as invalid all data payloads in segments of the plurality of segments other than a segment referenced by the entry in the block map corresponding to the each write address.

16. The method of claim 11, further comprising:
maintaining, by the storage node, a block map by, for each write request of a plurality of write requests, updating a block map entry in the block map corresponding to a write address in the each write request to include—
(a) a segment identifier of a segment of the plurality of segments to which a data payload from the each write request is written and
(b) an offset within the segment of the plurality of segments to which the data payload from the each write request was written;
for each write address included in the metadata entries of the plurality of segments, marking, by the storage node, as invalid all data payloads in the plurality of segments for which the corresponding metadata entry includes the each write address except for the data payload at the offset included in the block map entry for the each write address within the segment of the plurality of segments referenced in the block map entry for the each write address.

17. The method of claim 11, wherein the first portion of the each segment begins at a first end of the each segment and the second portion of the each segment begins at a second end of the each segment opposite the first end.

18. The method of claim 17, further comprising processing, by the storage node, the plurality of write requests by, for each write request of the plurality of write requests:
in response to determining that a segment entry in the segment map references a storage volume referenced by the each write request and corresponds to an available segment, the available segment being a segment of the plurality of segments having sufficient space for the data payload of the each write request, performing—
(a) writing the data payload from the each write request at a free location at an end of the first portion of the available segment;
(b) adding a new metadata entry to the second portion, the new metadata entry including a write address from the each write request; and
(c) adding a first block map entry to a block map, the block map entry mapping the write address from the each write request to the available segment and including an offset within the available segment to which the data payload of the each write request was written.

19. The method of claim 18, further comprising processing a plurality of read requests by, for each read request of the plurality of read requests:
identifying, by the storage node, a read block map entry in the block map corresponding to the each read request; and
reading, by the storage node, read data from an offset of the read block map entry in a segment of the plurality of segments referenced by the read block map entry.

20. The method of claim 17, further comprising processing, by the storage node, the plurality of write requests by, for each write request of the plurality of write requests:
in response to determining that no segment entry in the segment map both references the storage volume referenced by the each write request and corresponds to a segment having sufficient space for the data payload of the each write request, performing—
(a) selecting an unassigned segment from the plurality of segments;
(b) adding a reference to the storage volume referenced by the each write request to a segment entry of the segment map corresponding to the unassigned segment;
(c) writing the data payload of the each write request to a free location at an end of the first portion of the unassigned segment;
(d) adding a new metadata entry to the second portion of the unassigned segment; and
(e) adding a second block map entry to the block map, the block map entry mapping the write address from the each write request to the unassigned segment and including an offset within the unassigned segment to which the data payload of the each write request was written.

* * * * *